(12) United States Patent
Sugihara et al.

(10) Patent No.: US 8,305,297 B2
(45) Date of Patent: Nov. 6, 2012

(54) SPECTACLES-TYPE IMAGE DISPLAY DEVICE

(75) Inventors: Ryohei Sugihara, Machida (JP); Seiji Tatsuta, Hachioji (JP); Yoichi Iba, Hachioji (JP)

(73) Assignee: Olympus Corporation, Tokyo (JP)

( * ) Notice: Subject to any disclaimer, the term of this patent is extended or adjusted under 35 U.S.C. 154(b) by 175 days.

(21) Appl. No.: 12/807,402

(22) Filed: Sep. 3, 2010

(65) Prior Publication Data

US 2011/0057863 A1 Mar. 10, 2011

(30) Foreign Application Priority Data

Sep. 10, 2009 (JP) ................................ 2009-209749

(51) Int. Cl.
*G09G 5/00* (2006.01)
*H04N 13/04* (2006.01)
*G02B 27/14* (2006.01)
(52) U.S. Cl. .............................. 345/8; 348/56; 359/630
(58) Field of Classification Search ........ 345/8; 348/46, 348/56; 359/630
See application file for complete search history.

(56) References Cited

U.S. PATENT DOCUMENTS

| | | | | |
|---|---|---|---|---|
| 4,602,849 A | * | 7/1986 | Nicholson | 359/30 |
| 4,750,830 A | * | 6/1988 | Lee | 351/211 |
| 5,621,424 A | * | 4/1997 | Shimada et al. | 345/8 |
| 7,719,769 B2 | * | 5/2010 | Sugihara et al. | 359/630 |
| 2006/0132382 A1 | * | 6/2006 | Jannard | 345/8 |
| 2007/0058261 A1 | * | 3/2007 | Sugihara et al. | 359/630 |
| 2007/0279586 A1 | * | 12/2007 | Jethmalani et al. | 351/164 |
| 2009/0189974 A1 | * | 7/2009 | Deering | 348/46 |
| 2010/0149073 A1 | * | 6/2010 | Chaum et al. | 345/8 |
| 2011/0057863 A1 | * | 3/2011 | Sugihara et al. | 345/8 |
| 2011/0149418 A1 | * | 6/2011 | Togino et al. | 359/742 |
| 2011/0234476 A1 | * | 9/2011 | Sugihara et al. | 345/8 |
| 2011/0313344 A1 | * | 12/2011 | Daxer | 604/22 |

FOREIGN PATENT DOCUMENTS

| | | |
|---|---|---|
| JP | 2830291 | 9/1998 |
| JP | 2001-166703 | 6/2001 |
| JP | 2006-209144 | 8/2006 |

* cited by examiner

*Primary Examiner* — Dwayne Bost
*Assistant Examiner* — Scott Trandai
(74) *Attorney, Agent, or Firm* — Kenyon & Kenyon LLP

(57) ABSTRACT

A spectacles-type image display device comprises an image output unit for outputting image light of images to be displayed and a reflection unit disposed in a field of view of at least one eyeball of a viewer. The reflection unit is adapted to reflect the image light output from the image output unit toward the eyeball of the viewer so that the viewer can see virtual images of the images. The minimum value of a width of a projection cross-section of the reflection unit in an output direction of the image light to the eyeball is smaller than a dark-adapted pupil diameter of human and is larger than a light-adapted pupil diameter of human.

2 Claims, 12 Drawing Sheets not more than 3.8mm
but not less than 1mm

FIG. 5
(a)
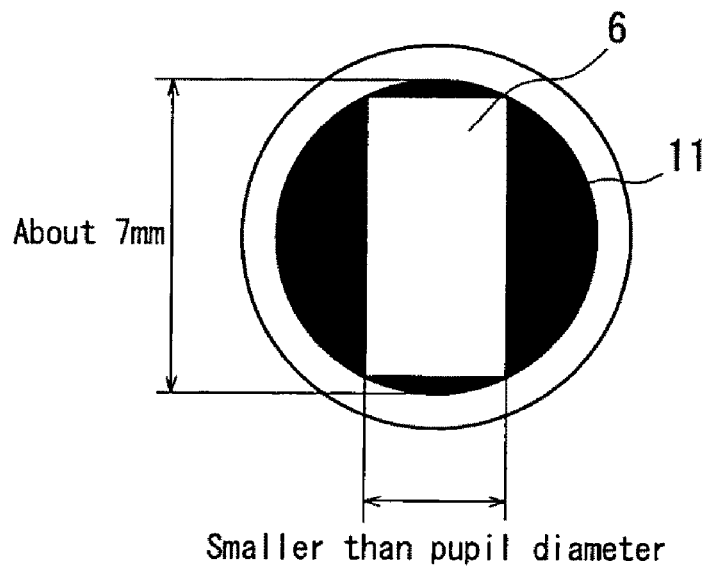
(b)
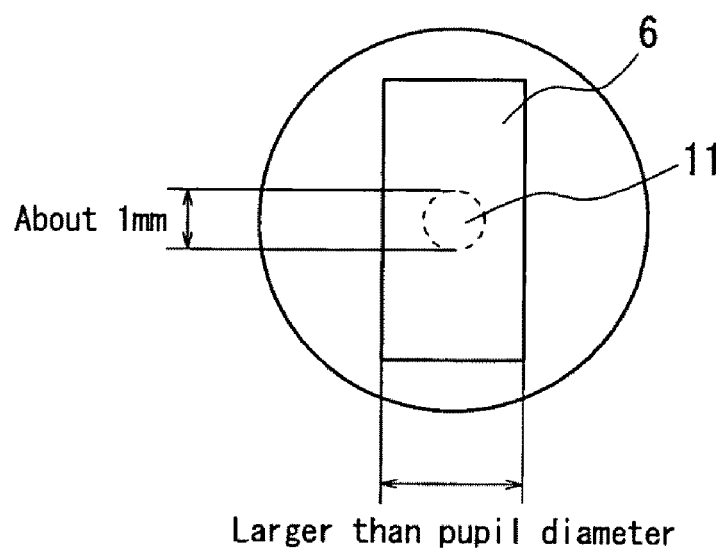

FIG. 6
(a)
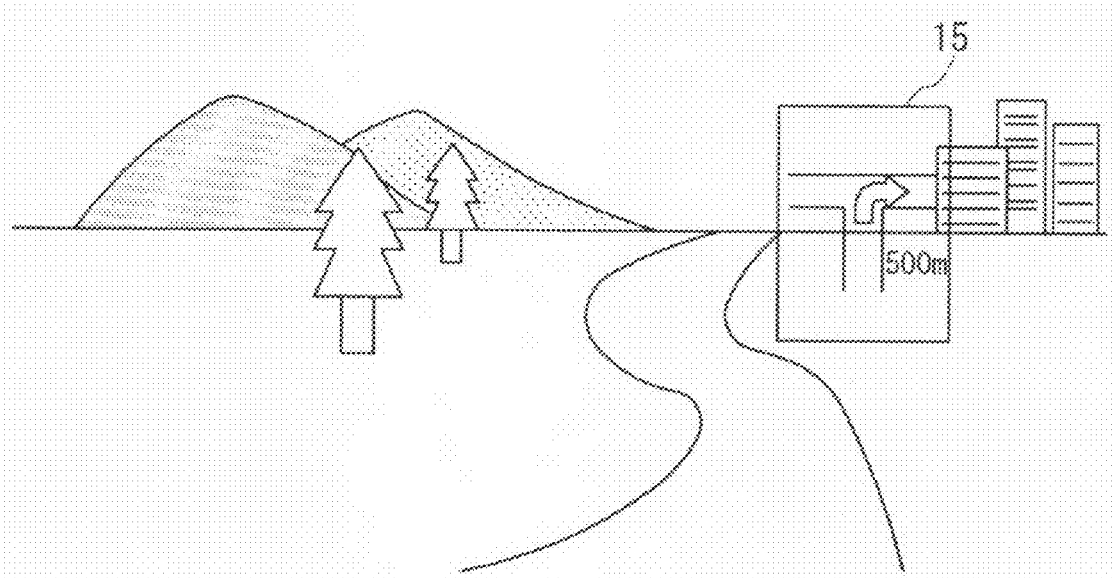
(b)
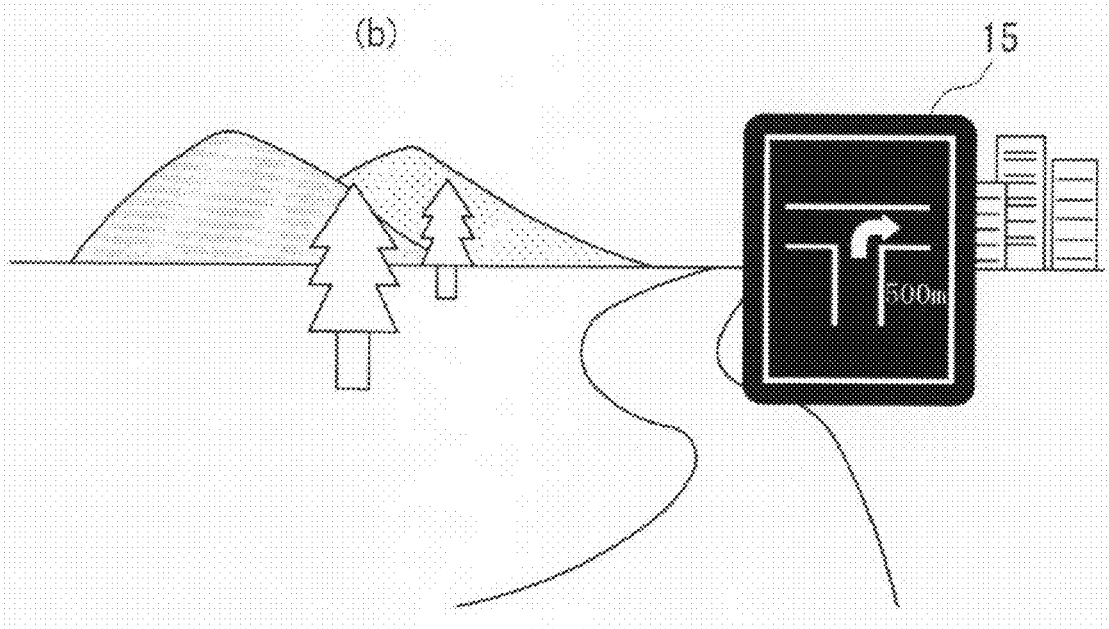

FIG. 12
(a)
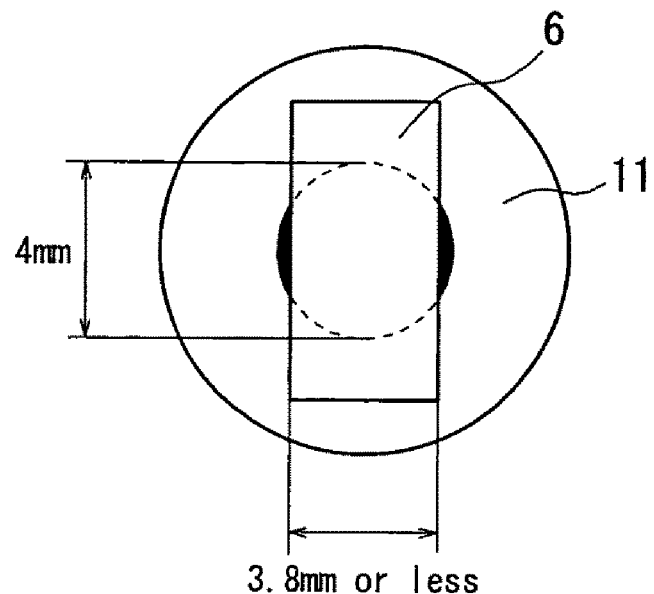
(b)
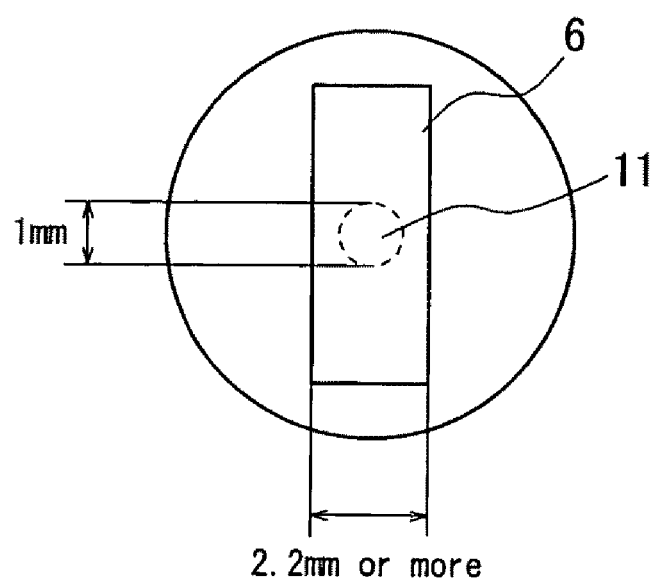

SPECTACLES-TYPE IMAGE DISPLAY DEVICE

CROSS-REFERENCE TO RELATED APPLICATION

The present application claims priority from Japanese Application No. 2009-209749 filed on Sep. 10, 2009, the content of which is incorporated herein by reference.

FIELD OF THE INVENTION

The present invention relates to spectacles-type image display devices.

BACKGROUND OF THE INVENTION

Conventionally, as a spectacles-type image display device, for example, a device that includes an image output unit held on the temple side of spectacles and an eyepiece optical unit held adjacent to a lens of spectacles is suggested. Such spectacles-type image display device is configured so that the image light of electronic images to be displayed that is output from the image output unit is incident on an eyeball of a viewer through an eyepiece optical unit so that the viewer can see the images. In such spectacles-type image display device, usually, the electronic images and the background images that transmit a spectacle lens are superimposed and displayed on an eyeball and, thereby a viewer can see the electronic images as translucent images, that is, see-through images in his/her field of view.

As a method of realizing see-through images, a device that uses a half mirror and lens or a concave mirror for an eyepiece optical unit and a device provided with a holographic optical element disposed on a spectacle lens (see, for example, JP2006209144 (A)) are known.

However, when electronic images are displayed in a see-through manner, if the environment is too bright, image light intensity of the background image will be too high and the light intensity of the electronic images will suffer from it, causing difficulty in viewing. So, if the luminance of the electronic images is increased in order to improve visibility, the luminance which is more than ten times the normal luminance is needed. Thus more power is consumed, which is economically inefficient. Therefore, in such environment, decrease in transmittance of the background images that are superimposed on the electronic images, in other words, decrease in the degree of see-through, is suggested to provide easy-to-see images.

For example, a spectacles-type image display device having an electrical switching means (see, for example, JP2830291 (B2)) that employs a liquid crystal shutter as a means for switching between see-through and non see-through or having a mechanical mechanism by which the background light is adjusted by mounting or dismounting a shielding member made of material which is a mixture of transparent material and colored material depending on the ambient brightness (see, for example, JP2001166703 (A)) is suggested.

SUMMARY OF THE INVENTION

A first aspect of the invention is a spectacles-type image display device including:

an image output unit for outputting image light of images to be displayed; and a reflection unit disposed in a field of view of at least one eyeball of a viewer, the reflection unit being adapted to reflect the image light output from the image output unit toward the eyeball of the viewer so that the viewer can see virtual images of the images, wherein the minimum value of a width of a projection cross-section of the reflection unit in an output direction of the image light to the eyeball is smaller than a dark-adapted pupil diameter of human and is larger than a light-adapted pupil diameter of human.

A second aspect of the invention resides in the spectacles-type image display device in accordance with the first aspect, wherein, the minimum value of the width of the projection cross-section of the reflection unit in the output direction of the image light is not more than 3.8 mm but not less than 1 mm.

A third aspect of the invention resides in the spectacles-type image display device in accordance with the first aspect, wherein the width, h, of the projection cross-section of the reflection unit in the output direction of the image light satisfies following equation;

$$w \cdot d/f + 1 \text{ mm} \leq h,$$

wherein w is a distance from a pupil position of the viewer to the center of the reflection unit, f is a focal length of a projection lens provided to form the virtual image in the eyeball of the viewer and d is a width of an image display element of the image output unit that corresponds to a width direction of the projection cross-section.

It should be noted that, in the present specification, "dark adaptation" is defined as a state where human eyes adapt to darkness in a very dark environment and "light adaptation" is defined as a state where human eyes adapt to brightness in a very bright environment. The dark-adapted pupil diameter of human is about 7 mm and the light-adapted pupil diameter of human is about 1 mm. It is noted that the human pupil diameter changes from 1 to 7 mm depending on the ambient brightness and the average pupil diameter is 4 mm in a normal environment.

BRIEF DESCRIPTION OF THE DRAWING

FIG. 5A is a diagram illustrating a relationship between the size of a plane mirror of the spectacles-type image display device of FIG. 1 and the pupil diameter size under dark adaptation;

FIG. 5B is a diagram illustrating a relationship between the size of a plane mirror of the spectacles-type image display device of FIG. 1 and the pupil diameter size under light adaptation;

FIG. 6A is a diagram showing a see-through display image of the spectacles-type image display device of FIG. 1;

FIG. 6B is a diagram showing a non see-through display image of the spectacles-type image display device of FIG. 1;

FIG. 12A is a diagram illustrating a relationship between the size of a plane mirror of a spectacles-type image display device in accordance with a fourth embodiment of the present invention and the pupil diameter size in a normal environment; and FIG. 12B is a diagram illustrating a relationship between the size of a plane mirror of the spectacles-type image display device in accordance with the fourth embodiment of the present invention and the pupil diameter size under light adaptation.

DESCRIPTION OF THE PREFERRED EMBODIMENTS

Embodiments of the present invention are illustrated below with reference to the diagrams.

First Embodiment

Figure 1:
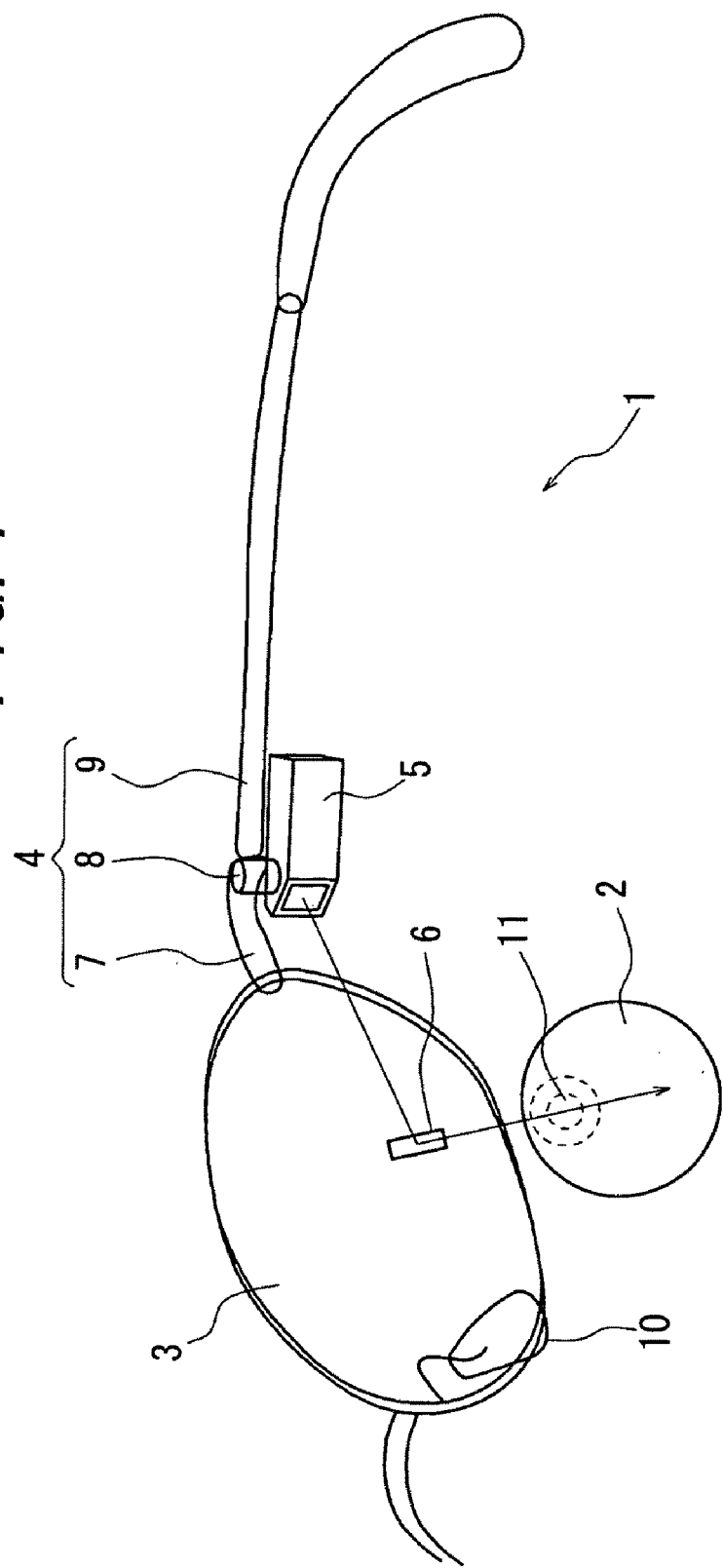
FIG. 1 is a partial configuration diagram schematically illustrating main parts of a spectacles-type image display device in accordance with a first embodiment of the present invention.
Figure 2:
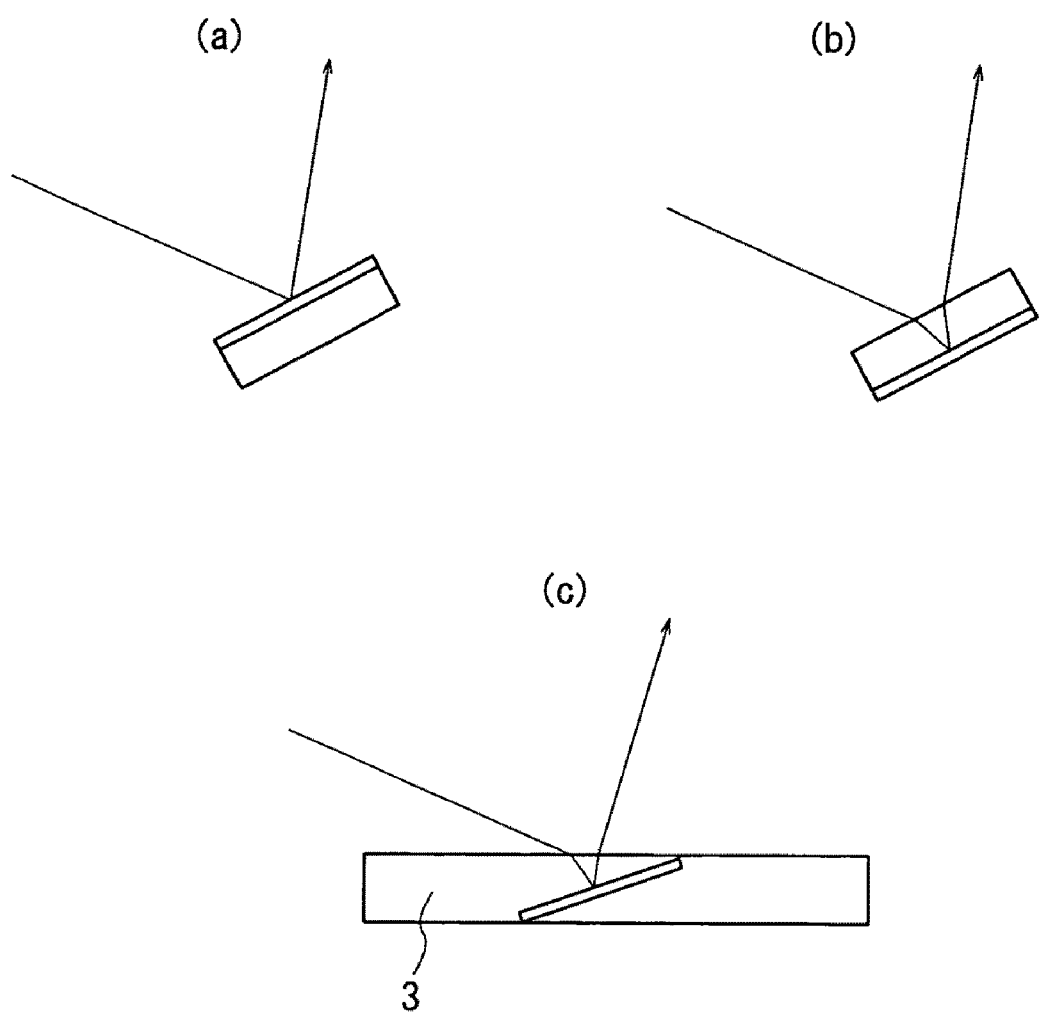
FIG. 2 is a diagram illustrating an example of a reflection unit used for carrying out the present invention.

FIG. 1 is a partial configuration diagram schematically illustrating main parts of a spectacles-type image display device in accordance with a first embodiment of the present invention. In this diagram, an eyeball 2 of the right eye of a viewer when he/she wears the spectacles-type image display device 1 is also shown. The spectacles-type image display device 1 has a configuration in which an image output unit 5 and a plane mirror 6 constituting a reflection unit is added to a spectacle mainly constituted by a spectacle lens 3 and a spectacle frame 4.

The spectacle frame 4 includes an endpiece 7 that is fixed to the spectacle lens 3 or to a frame of the spectacle lens 3 and is located at both ends on the front surface of the spectacle and a temple 9 foldably coupled through the endpiece 7 and a hinge 8. The position of the spectacles-type image display device 1 is fixed with respect to the eyeball 2 of the viewer by hanging temples 9 over ears of the viewer and putting a nose pad 10 that is fixed to the spectacle lens 3 or its frame against a nose of the viewer.

The image output unit 5 is supported, for example, by the temple 9 of the spectacle frame 4, has a compact image display element such as, for example, a liquid crystal element or an organic EL element and a lens provided in front of the image display element, and outputs image light of electronic images to be displayed to the plane mirror 6 through the space between the spectacle lens 3 and the temple 9.

The plane mirror 6 is held, for example, in the field of view of at least one eyeball (for the right eye in the diagram) and near the spectacle lens 3, for example, to the surface of the lens part of the spectacle lens 3. The angle of the reflection surface of the plane mirror 6 is adjusted so that the image light that is output from the image output unit 5 is reflected toward the eyeball 2 of the viewer and, thereby the viewer can see the electronic images to be displayed as virtual images. As a plane mirror 6, (a) front surface reflection mirror, (b) rear surface reflection mirror, (c) mirror embedded in a spectacle lens and the like can be used. As a front surface reflection mirror and a rear surface reflection mirror, a mirror whose front surface and back surface are treated respectively with a typical mirror coating such as metal deposition or dielectric multi-layered film can be used. At this time, completely non see-through display can be realized under light adaptation if an opaque mirror is used, and if a transparent half mirror is used, background light can be transmitted partially even in the non see-through state under light adaptation. If a mirror embedded in the spectacle lens is used, the angle of tilt can be reduced by the refraction between the spectacle lens and the air.

Figure 3:
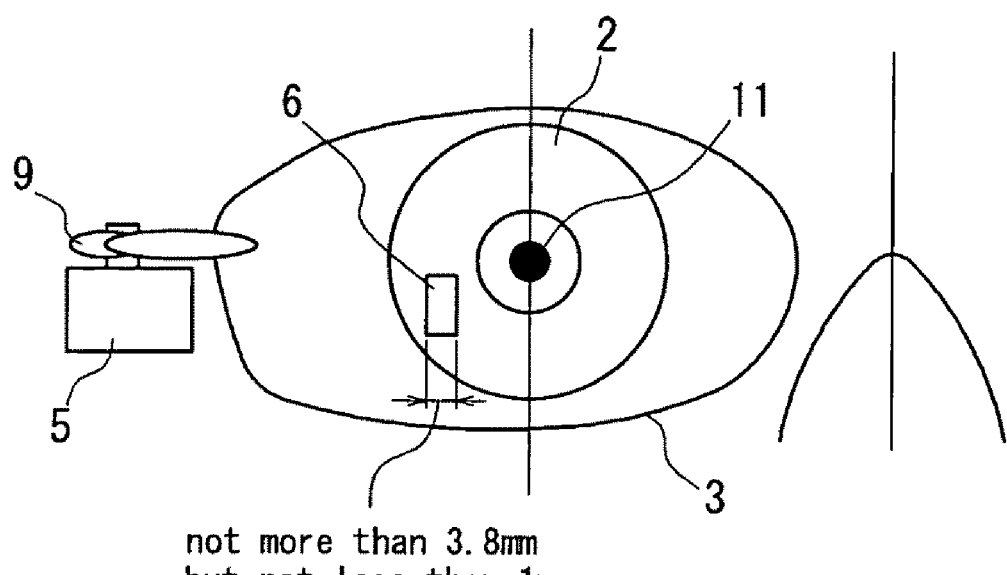
FIG. 3 is an elevation view of the right eye side of a viewer when the viewer wears the spectacles-type image display device of FIG. 1.

FIG. 3 is an elevation view of the right eye side of a viewer when the viewer wears the spectacles-type image display device of FIG. 1. The plane mirror 6 is, when facing a pupil 11, disposed relatively nearer the image output unit 5. In addition, the plane mirror 6 is in the shape of vertically-long rectangular, and the horizontal width of the projection cross-section in the output direction of the image light to the eyeball is from 1 mm to 7 mm, and preferably, from 1 mm to 3.8 mm.

Figure 4:
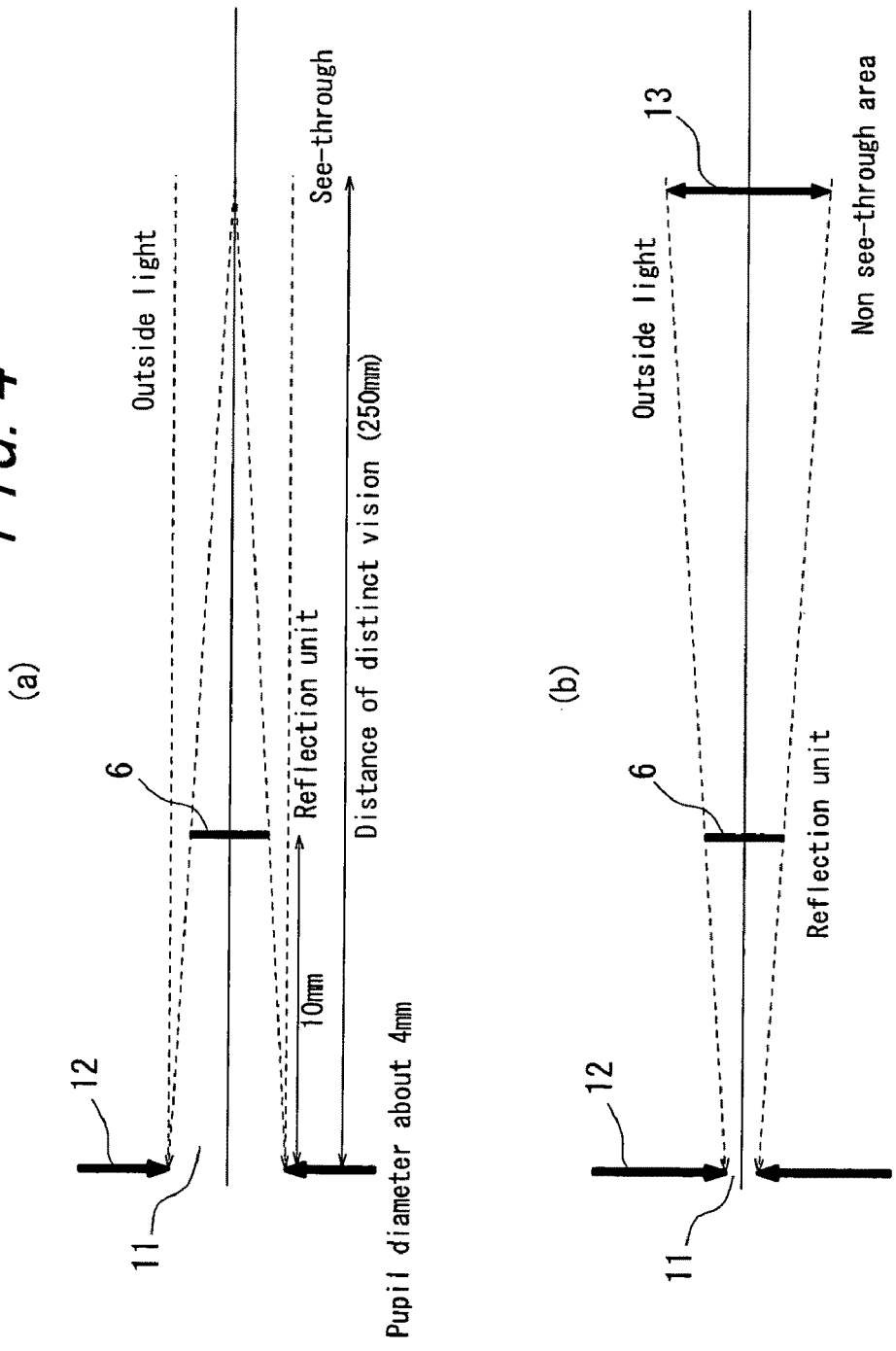
FIG. 4A is a principle diagram illustrating switching between see-through display and non see-through display depending on change in a pupil diameter in a normal environment.
FIG. 4B is a principle diagram illustrating switching between see-through display and non see-through display depending on change in a pupil diameter in a very bright environment.

Next, switching between see-through display and non see-through display depending on the ambient environment is described. FIG. 4 is a principle diagram illustrating switching between see-through display and non see-through display depending on the change in the pupil diameter. FIG. 4 shows the pupil 11 whose size is changed by an iris 12 in the eyeball and an optical system of outside light including the plane mirror 6 as seen from above. In this diagram, the outside light that reaches the pupil 11 without being obstructed by the plane mirror 6 is indicated by dashed arrows. Further, FIG. 4A shows the state in a normal environment and FIG. 4B shows the state where the environment is very bright and the pupil diameter is the smallest.

In the case of normal environment shown in FIG. 4A, the diameter of the pupil 11 is 4 mm and the distance between the pupil 11 and the plane mirror 6 is about 10 mm. If the horizontal width of the plane mirror 6 is 3.8 mm or less as shown in FIG. 4A, the light from the outside view that is farther than the distance of distinct vision (normally 250 mm), which is the distance from the pupil 11 at which the human can comfortably look at an object, can pass through anywhere in the pupil. In this case, a viewer can see both the outside view and the electronic images as see-through images within the viewing angle of the electronic images.

On the other hand, when the ambient environment is bright and the pupil diameter is the smallest as shown in FIG. 4B, the pupil diameter contracts to 1 mm due to light adaptation. At this time, since the horizontal width of the plane mirror, which is a width of the projection cross-section in the output direction of the image light to the eyeball, is larger than 1 mm, an area in which the light from the outside view is obstructed by the plane mirror 6 and does not reach the pupil 11 exists in front of the plane mirror 6 as seen from the viewer. Because of this, a non see-through area 13 where the outside light cannot pass through the pupil 11 is generated in the field of view of the viewer. In the non see-through area 13, only electronic images can be seen and an excellent visibility can be obtained without being obstructed by the bright outside view.

FIG. 5 is a diagram illustrating a relationship between the size of the plane mirror of the spectacles-type image display device of FIG. 1 and the pupil diameter size. FIG. 5A shows the state under dark adaptation (the pupil diameter is the largest) and FIG. 5B shows the state under light adaptation (the pupil diameter is the smallest).

In a very dark environment, it is preferable that the electronic images are displayed with the outside view in a see-through manner. In this case, since a dark-adapted pupil diameter is about 7 mm, the pupil diameter is larger than the horizontal width of the plane mirror, which is 3.8 mm, as shown in FIG. 5A and, thereby see-through display is realized. It should be noted that, in this case, if the horizontal width of the plane mirror 6 is less than 7 mm, which is the dark-adapted human pupil diameter 11, see-through display can be achieved.

On the other hand, in a very bright environment, when the electronic images are displayed in a see-through manner, the luminance of the electronic images is weak against the outside light from the outside view, resulting in a very indistinct display. Thus it is preferable that the outside light is shut so that the images are displayed in a non see-through manner. In this case, as shown in FIG. 5B, the human pupil diameter is about 1 mm due to light adaptation. Therefore, non see-through display can be achieved in a distance of distinct vision by providing a horizontal width of the plane mirror 6 larger than 1 mm.

FIG. 6 is a diagram showing a display image of the spectacles-type image display device of FIG. 1. FIG. 6A shows a see-through display in a normal environment and FIG. 6B shows a non see-through display in a very bright environment. As shown in FIG. 6A, in a normal environment, the electronic images by the image light, which is output by the image output unit 5, is reflected by the plane mirror 6 and is incident on the eyeball, are superimposed on the outside view and displayed in a see-through manner in the field of view of the viewer who wears the spectacles-type image display device 1. On the other hand, as shown in FIG. 6B, in a very bright environment, the pupil 11 becomes smaller due to light adaptation and the background light from the outside background is blocked by the plane mirror 6 and is not incident on the pupil. Therefore only the electronic images from the image output unit 5 are displayed in a non see-through manner.

As described above, according to the present embodiment, with respect to the plane mirror 6, the projection cross-section in the output direction of the image light to the eyeball 2 is in the shape of vertically long rectangular and the horizontal width of the projection cross-section is in the range of the light-adapted pupil diameter (1 mm) to dark-adapted pupil diameter (7 mm) and, thereby switching between see-through display and non see-through display is possible depending on a very dark environment (dark adaptation) and a very bright environment (light adaptation). Further, if the horizontal width of the projection cross-section is in the range of 1 mm to 3.8 mm, the electronic images can be displayed in a see-through manner in a normal environment and in a non see-through manner in a very bright environment. In other words, distinct display can be achieved by switching between see-through display and non see-through display depending on the ambient brightness without using an electrical or mechanical mechanism.

It should be noted that although the spectacles-type image display device 1 illustrated by the present embodiment is configured to display electronic images to the right eye; it may be configured to display electronic images to the left eye.

Second Embodiment

Figure 7:
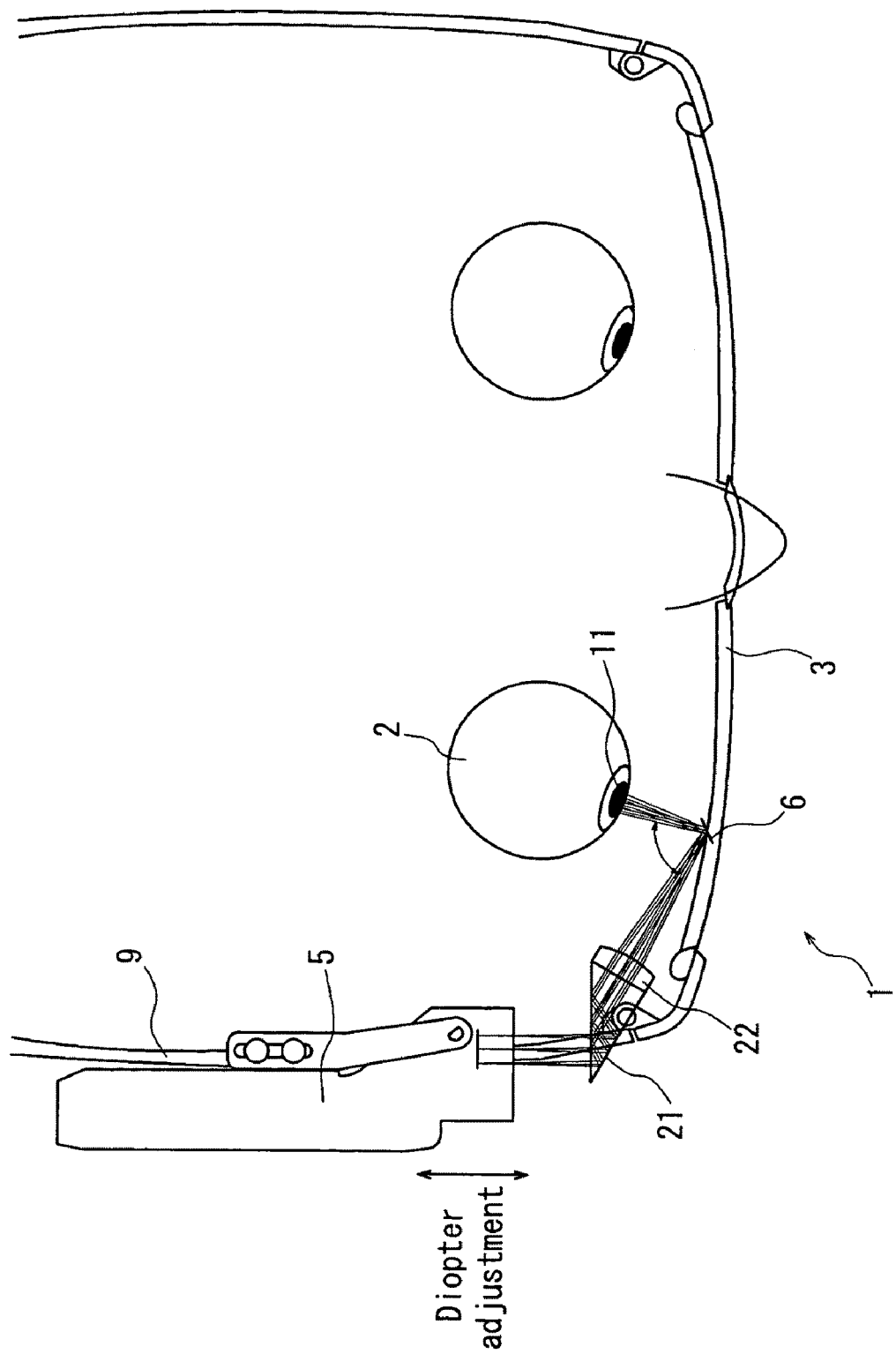
FIG. 7 is a diagram illustrating a configuration and in-use state of a spectacles-type image display device in accordance with a second embodiment of the present invention.

FIG. 7 is a diagram illustrating a configuration and in-use state of a spectacles-type image display device in accordance with a second embodiment of the present invention. FIG. 7 shows, in addition to a schematic configuration of the spectacles-type image display device 1, a light path of the image light that is output from the image output unit 5 and reaches the pupil 11 of the eyeball 2.

As shown in FIG. 7, the spectacles-type image display device in accordance with the present embodiment includes, in addition to the configuration of the spectacles-type image display device 1 of FIG. 1, a deviation prism 21 coupled to the temple 9 and a projection lens 22 coupled to the output surface of the deviation prism 21. The deviation prism 21 and the projection lens 22 may be integrally molded. Further, the device is configured so that the image light that is output from the image output unit 5 along the temple 9 is incident on the incident surface of the deviation prism 21, is deviated by about 60 degrees, is output to the plane mirror 6 that is disposed on the spectacle lens 3 through the projection lens 22 and is reflected by the plane mirror 6 toward the pupil 11.

Further, the image output unit 5 is coupled so that its position can be adjusted along the temple 9 in back and forth direction of the spectacle and, thereby adjustment can be made depending on the diopter of the viewer wearing the device. It should be noted that the angle formed by connecting the center of the plane mirror 6 and the center of the pupil 11 is preferably from 60 to 90 degrees.

Figure 8:
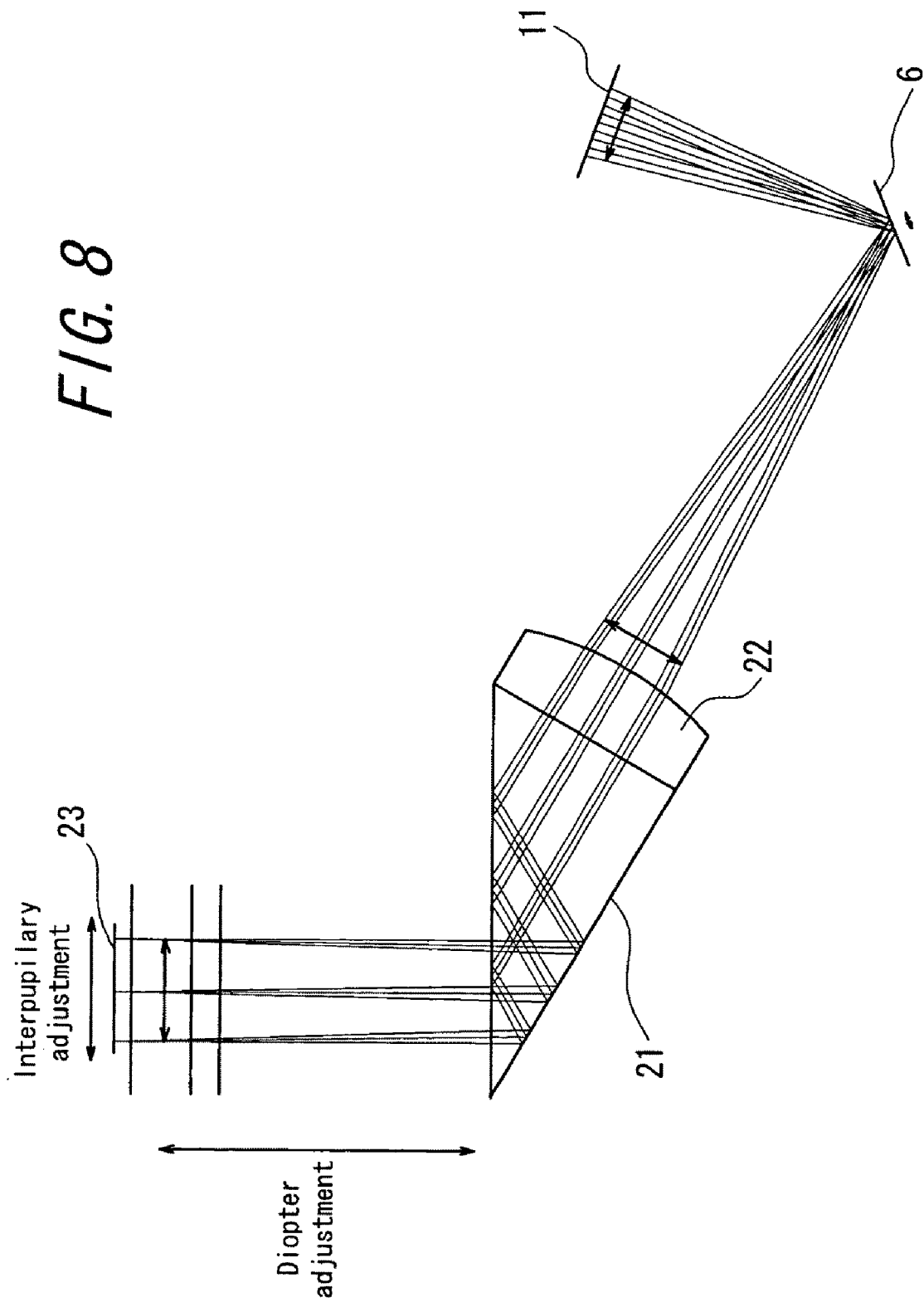
FIG. 8 is a diagram showing an optical system of the spectacles-type image display device of FIG. 6.

FIG. 8 is a diagram showing an optical system of the spectacles-type image display device of FIG. 7. The image light that is output from the display element 23 provided at the image output unit 5 is diffused and is incident on the deviation prism 21, is deviated thereby, is collected by the projection lens 22 so that the width of the luminous flux of the image light will be the smallest at the plane mirror 6 and is reflected to the pupil 11. At this time, the plane mirror 6 functions as an aperture stop and, thereby even if it is smaller than the pupil 11, the display element 23 and the projection lens 22, the viewer can see an entire screen of electronic image without missing a portion thereof. Other configurations and functions are the same as those of the first embodiment, thus the identical reference numerals are allocated to the identical configuration elements and descriptions thereof are omitted.

According to the present embodiment, in addition to the effects by the first embodiment, since the image output unit 5 is configured so that its position can be adjusted along the temple 9, the image output unit 5 outputs the image light along the temple 9 and the deviation prism 21 deviates the image light toward the plane mirror 6, the diopter can be adjusted with respect to the electronic images to be displayed by adjusting the position of the image output unit 5.

Third Embodiment

Figure 9:
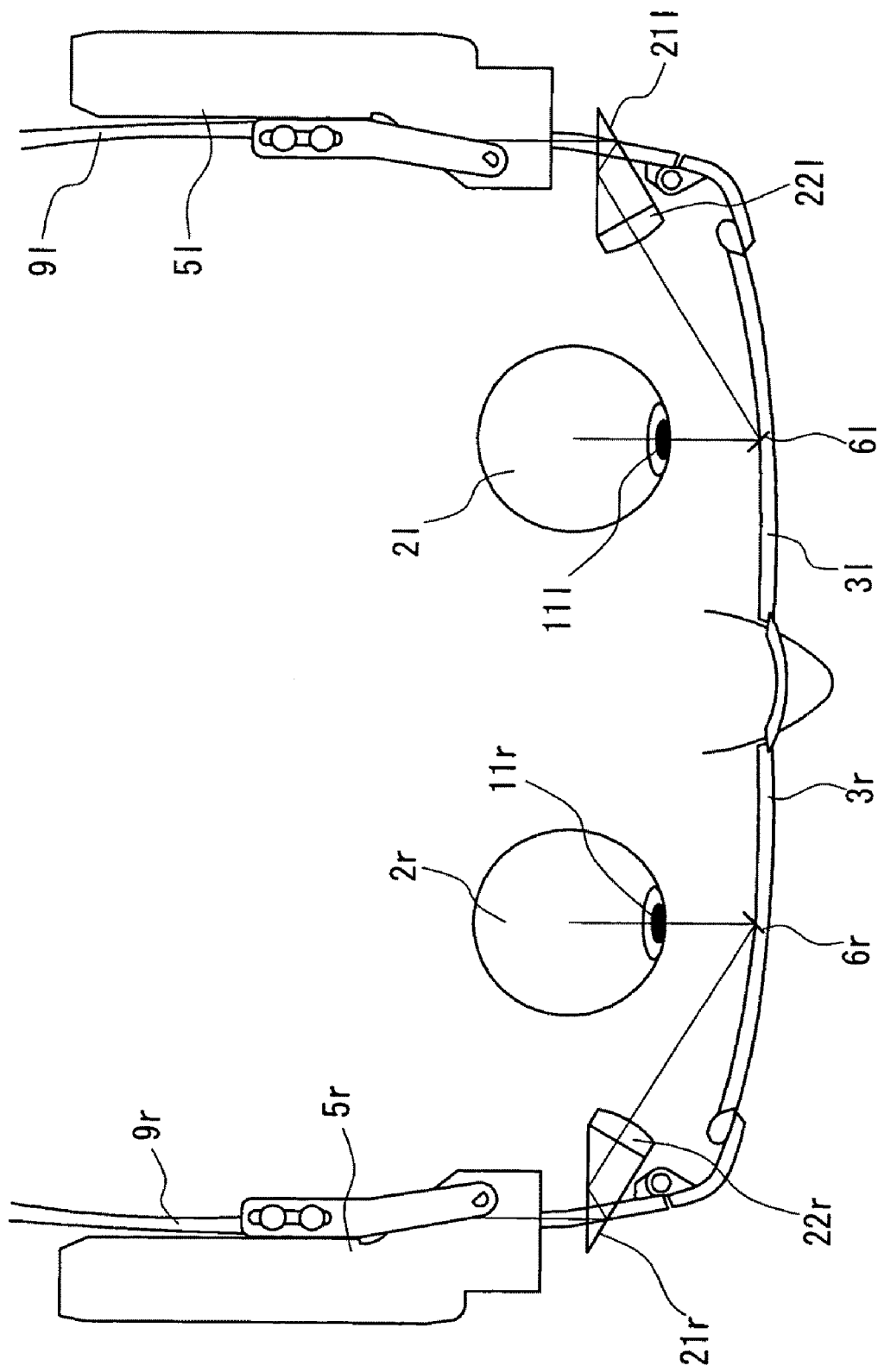
FIG. 9 is a diagram illustrating a configuration and in-use state of a spectacles-type image display device in accordance with a third embodiment of the present invention.

FIG. 9 is a diagram illustrating a configuration and in-use state of a spectacles-type image display device in accordance with a third embodiment of the present invention. In the present embodiment, image output units 5*l* and 5*r*, deviation prisms 21*l* and 21*r*, projection lenses 22*l* and 22*r* and plane mirrors 6*l* and 6*r* are respectively provided with respect to the left eyeball 2*l* and the right eyeball 2*r*. Except for the plane mirrors 6*l* and 6*r* provided respectively straight in front of each eyeball, each configuration of the spectacles-type image display device of FIG. 10 for the right eye is provided for the left eye.

In this case, in the sate where a viewer faces the front, electronic images output from the image output unit 5*l* on the left side and electronic images output from the image output unit 5*r* on the right side are superimposed and displayed in the field of view and in front of the viewer and, thereby in addition to the effects of the second embodiment, three-dimensional images can be displayed in the field of view of the viewer, for example, by displaying disparity images to the right eye and the left eye.

Fourth Embodiment

Figure 10:
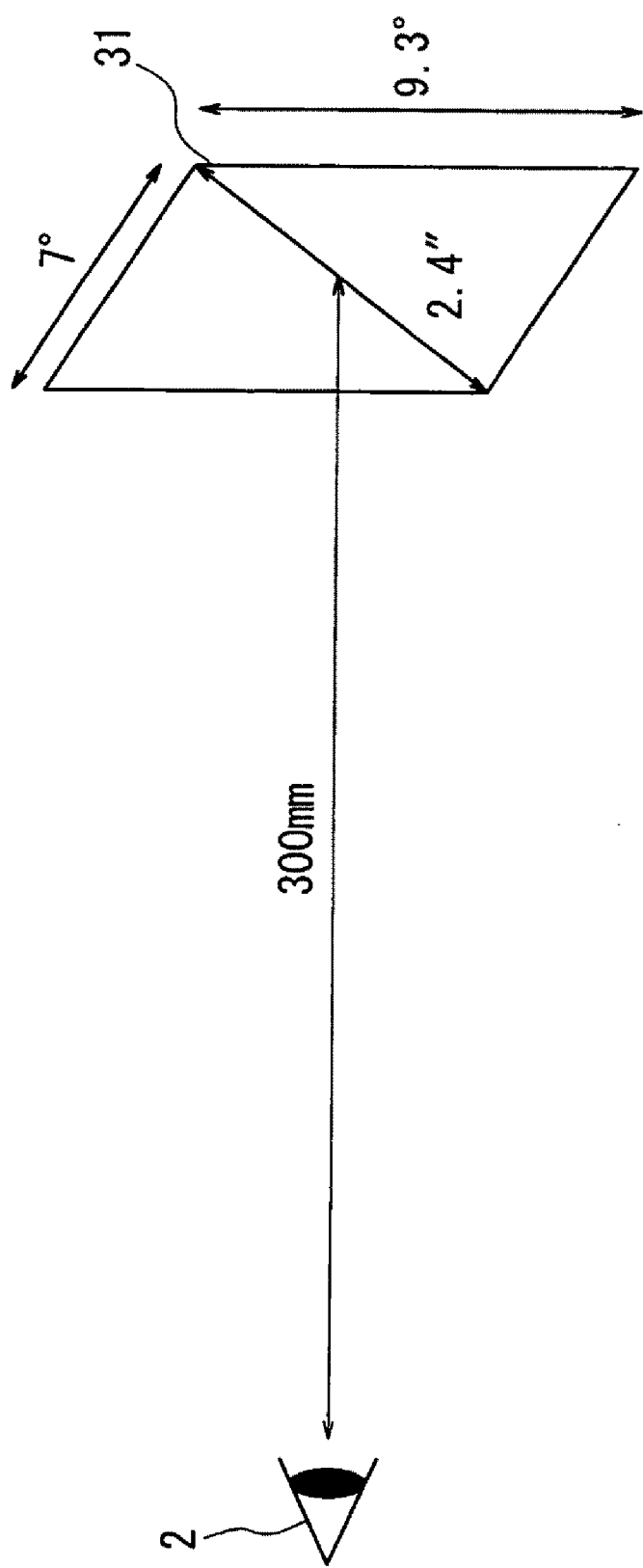
FIG. 10 is a diagram illustrating an angle of view of a display screen of a portable digital device as seen from a viewer.

In the fourth embodiment of the present invention, an image like a screen of a portable digital device such as a generally-used cellular phone that is placed at a position 300 mm away from an eyeball is displayed by the spectacles-type image display device. FIG. 10 is a diagram illustrating an angle of view of a display screen 31 of the portable digital device as seen from a viewer.

The display screen 31 of the portable digital device that is usually used is about 2.4" and in the shape of vertically-long rectangular, and if the distance from the eyeball is 300 mm, the angle of view is about 7 degrees for the short side and about 9.3 degrees for the long side.

Figure 11:
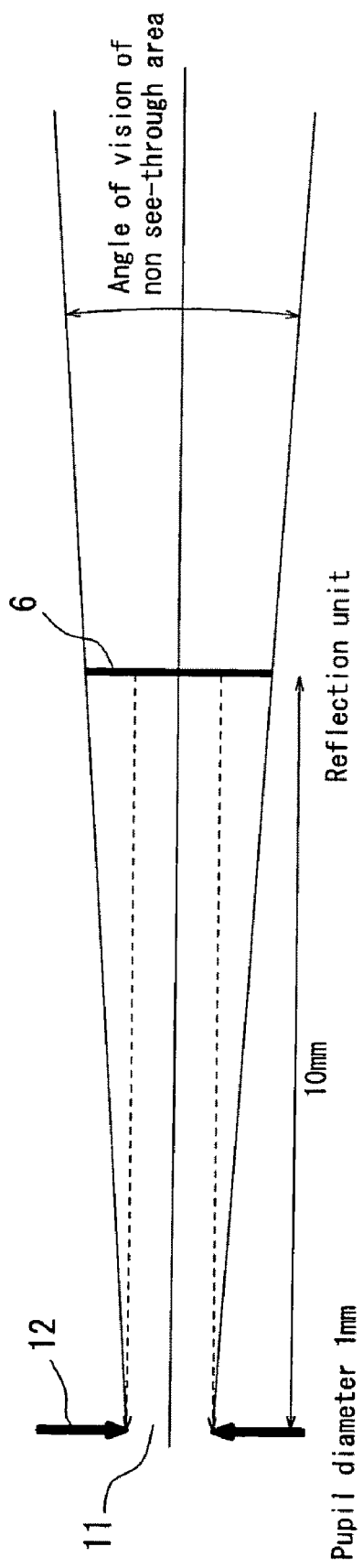
FIG. 11 is a diagram illustrating an angle of view of a non see-through area in a very bright environment.

FIG. 11 is a diagram illustrating the angle of view of a non see-through area in a very bright environment and under light adaptation. In the diagram, the pupil diameter is 1 mm and the minimum value of the width of projection cross-section of the plane mirror 6 in the output direction of image light to secure the non see-through area that covers 7 degrees of angle of view, which corresponds to the short side of the display screen of the above described portable digital device, is determined by the following formula;

10 mm×tan(3.5°)×2+1 mm=2.2 mm

As already described in the first embodiment, when seeing the reflective plane mirror 6 in the output direction of image light to the eyeball 2, switching between see-through and non see-through is possible depending on the change between a normal environment and a very bright environment if the width of the projection cross-section in the horizontal direction, which is the short side of the rectangular plane mirror 6, is from 1 mm to 3.8 mm. Therefore, when the width corresponding to the short side of the display screen of the plane mirror 6 is set to be not more than 3.8 mm but not less than 2.2 mm, a practically usable sized display screen similar to the portable digital terminal can be displayed in a see-through manner in a normal environment and in a non see-through manner in a very bright environment.

In other words, it is important to set so that the angle of view of non see-through area under light adaptation is larger than the angle of view of the display screen 31 displayed by the spectacles-type image display unit. The angle of view, $\theta$, of the non see-through area is represented by the formula shown below;

$$\theta = 2 \times \arctan\{(h-1)/2w\}$$

wherein h (mm) is the minimum value of the width of the projection cross-section of the reflection unit in the output direction of the image light to the eyeball, w (mm) is the distance from the pupil position to the center of the reflection unit and the light-adapted pupil diameter is 1 mm.

On the other hand, the angle of view, $\omega$, of the display screen for comparison is represented by the formula shown below;

$$\omega = 2 \times \arctan(d/2f)$$

wherein d (mm) is the width of the display element in the direction that corresponds to h shown above and f (mm) is the focal length of the projection lens. In order to allow $\theta$, the angle of view of non see-through area, to be larger than the angle of view, $\omega$, the relationship between them are indicated as $$\omega \leq \theta,$$

thus, the formula shown below is obtained, $$d/2f \leq (h-1)/2w$$

$$w \cdot d/f + 1 \leq h$$

In addition, in order to realize see-through display in a normal environment, h should satisfy h≦3.8 (mm). Combining it with the above formula, the following formula is obtained;

$$w \cdot d/f + 1 \text{ mm} \leq h \leq 3.8 \text{ mm}$$

See-through display in a normal environment and non see-through display that covers a display screen area in a bright environment are realized by setting a width of the reflection unit so that the above formula is satisfied, and an excellent visibility can be ensured.

FIG. 12 illustrates a relationship between the size of the plane mirror 6 of the spectacles-type image display device in accordance with the fourth embodiment of the present invention and the pupil diameter size. FIG. 12A shows the state in a normal environment and FIG. 12B shows the state under light adaptation. It is preferable that a blind area can be eliminated as much as possible in a normal environment by see-through display. Thus in FIG. 12A, see-through display is possible in a range that is farther than the distance of distinct vision if the size of the plane mirror 6 is 3.8 mm or less.

On the other hand, in a very bright environment, if electronic images are displayed in a see-through manner, luminance of the electronic images is weak against the outside light from the outside view, thus resulting in a very indistinct display. Thus it is preferable to shut the outside light to display in a non see-through manner. See-through display in the range of angle of view of 7 degrees, which is a practical display size, can be achieved if the width of projection cross-section of the plane mirror 6 in the output direction of image light is 2.2 mm or more.

In the present embodiment, the width of projection cross-section of the plane mirror 6 in the output direction of the image light is not more than 3.8 mm but not less than 2.2 mm and, thereby as shown in FIG. 6 of the first embodiment, switching between see-through display and non see-through display depending on the ambient environment is possible. At that time, a display area equivalent to a portable digital device can be secured as a display screen in the field of view of a viewer.

It should be noted that the present invention is not limited to the above-described embodiments, and various modifications and changes may be made. For example, although the image output unit of the spectacles-type image display device is coupled to the temple, it may be coupled, for example, to the endpiece.

Further, in each embodiment, a plane mirror, which is a reflection unit, is in the shape of vertically-long rectangular. However, it may be a horizontally-long rectangular. In addition, the reflection unit is not limited to a plane mirror, and a concave mirror may be used to configure an optical system. In that case, a lens of the image output unit can be omitted. Further, the shape of the two-dimensional image to be displayed is not limited to a vertically-long rectangular, and it can be a horizontally-long shape regardless of the shape of the reflection unit.

What is claimed is:
1. A spectacles-type image display device, comprising:
an image output unit for outputting image light of images to be displayed; and
a reflection unit disposed in a field of view of at least one eyeball of a viewer, the reflection unit being adapted to reflect the image light output from the image output unit toward the eyeball of the viewer for the viewer being able to see virtual images of the images, wherein, a width, h, of a projection cross-section of the reflection unit in an output direction of the image light satisfies following equation:

$$w \cdot d/f + 1 \leq h,$$

wherein w is a distance from a pupil position of the viewer to a center of the reflection unit, f is a focal length of a projection lens provided to form the virtual image in the eyeball of the viewer and d is a width of an image display element of the image output unit that corresponds to a width direction of the projection cross-section, where units of respective parameters are in mm, wherein, a minimum value of the width of the projection cross-section of the reflection unit in the output direction of the image light to the eyeball is smaller than a dark-adapted pupil diameter of human and is larger than a light-adapted pupil diameter of human.

2. The spectacles-type image display device according to claim 1, wherein, the minimum value of the width of the projection cross-section of the reflection unit in the output direction of the image light is not more than 3.8 mm but not less than 1 mm.

* * * * *